United States Patent Office 3,463,607
Patented Aug. 26, 1969

3,463,607
METHOD OF SYNTHESIZING ASBESTOS
Robert C. Johnson, Clinton, Tenn., and Haskiel R. Shell, Hyattsville, Md., assignors to the United States of America as represented by the Secretary of the Interior
No Drawing. Filed Nov. 4, 1966, Ser. No. 592,683
Int. Cl. C01b 33/22
U.S. Cl. 23—110                                10 Claims

ABSTRACT OF THE DISCLOSURE

Asbestos fibers oriented in a predetermined manner including parallel orientation are synthesized by employing solids as the asic reactants and maintaining a dispersion of large individual masses of the magnesium-containing reactant in the other basic reactant or reactants during the asbestos-forming reaction.

---

This invention relates to synthesizing usable quality asbestos fibers.

Asbestos, because it is a tough, incombustible heat insulator, is used in thousands of applications ranging from fillers to textiles. One of the most important uses is in friction materials, for which it has no substitutes. Another of the most important fields of use is in textile products such as cloth, yarn, tape and rovings. Fiber length is a critical factor in determining uses since long fibers are necessary for spinning.

For about fifty years, research aimed at synthesizing long, parallel asbestos fibers, like or similar to that found in nature, has been practically without success. In every case reported the fibers synthesized were submicroscopic in size and were not parallel except for the occurrence of isolated small bundles or pockets of the fibers. The acute need for methods of synthesizing usable asbestos was not fully realized until World War II caught this country and others short on supply of the natural fibers.

It has now been discovered that long amphibole and chrysotile asbestos fibers, oriented in a predetermined manner including parallel orientation, can be synthesized by employing solids as the basic reactants, and maintaining a dispersion of large individual masses of the magnesium-containing raw material reactant in the other basic reactant or reactants during the synthetic asbestos-forming reaction.

It is therefore an object of this invention to produce synthetic asbestos in fiber lengths comparable in quality and orientation to that of their natural counterparts.

A further object is to control the length of the fibers.

Other objects and advantages will be obvious from the detailed description of the process appearing in the specification.

Whichever synthetic asbestos it is desired to produce (i.e., amphibole or chrysotile), in accordance with the general practice of the present invention, large individual masses of magnesium-containing raw material are first dispersed in the other basic raw material (e.g., a silica-containing compound) by, for example, placing the magnesium-containing material in alternating layers, in a suitable container, between layers of the other ingredient, all of these raw materials being solids. If more than one other metal compound-containing substance is to be reacted with the magnesium-containing raw material, these other substances are preliminarily intimately mixed together, as solids, with the silica compound prior to layering. Tamping is then employed to pack these stacked layers. Alternatively, each individual layer can be pressed before stacking. Thereafter, the packed layers are placed in a heated reaction zone. Depending upon the particular raw materials employed and desired asbestos product, water and additives can be introduced into the reaction zone, if necessary, to contact the layers. Long, parallel fibers result from the layered reactants. Fiber length can be increased by employing thicker layers of reactants during the reaction.

One theory advanced with regard to the results of the process of the present invention is that the magnesium-containing raw material is available only at the growing ends of the fibers due to the segregation of the magnesium substance from the other reactants whereas intimate mixing of all the raw materials results in very short, randomly oriented fibers because the supply of feed material for growth is constant in all directions and the reaction is completed before the fibers can grow long.

Prevention of intimate mixing of the magnesium-containing raw material with the other solid raw materials during the reaction can be accomplished by expedients other than layering. For example, long fibers can be grown if the magnesium-containing material is in the form of pellets or polycrystalline or fused lumps which are randomly dispersed in and surrounded by the other raw materials.

When layering is employed, individual layer thickness is not critical, except that the volume of reactants between an imaginary plane bisecting the thickness of one layer and a plane bisecting the thickness of an adjacent layer should contain an amount of raw material equivalent to the average batch composition. If magnesium-containing pellets or lumps are employed, a reasonable stoichiometry should be maintained between each magnesum-containing mass and the adjacent reactants.

As will be apparent to those skilled in the art, the process of the present invention is applicable to the production of any of the synthetic amphiboles. Many of these amphiboles are disclosed in U.S. Department of Interior, Bureau of Mines Report of Investigations Bulletin #5417, published 1958. It is only necessary that the magnesium-containing reactant be separated by layering, etc., from an intimate mixture of the other reactants comprising a silica compound and compounds of the other metal elements.

Further, as will be obvious to one skilled in this art, the particular reactants employed, the reaction environment, the reaction conditions and other variables depend upon the desired synthetic asbestos end product. For example, in the production of a fluoramphibole asbestos, such as the system $Na_{2-3}MgMg_5Si_3:O_xF_{4-2}$, from such compounds as (1) $Na_2SiF_6$, $NaF$, $Na_2CO_3$ or $Na_2O$; (2) $SiO_2$ or $SiO_2 \cdot xH_2O$; and (3) $MgO$, $Mg(OH)_2$ or $MgF_2$, the sodium-containing and silica-containing raw materials are first intimately blended together. Then layers of this powder mixture alternating with layers of the magnesium compound are stacked and packed by tamping into any suitable high temperature container made of a material such as fireclay, stainless steel, or alumina. A lid is placed on the container and it is placed in a furnace or kiln. The container and contents are then fired at a temperature of about 900° C.–1,000° C. at atmospheric pressure for at least about 25 hours and even up to 100 hours for batches with thick layers. Layers of long, parallel fluoramphibole fibers result, which fibers are perpendicular to the reactant layers.

Other synthetic asbestos products may require different operating conditions and environment. For example, in the production of a chrysotile such as the system $$3MgO \cdot 2SiO_2 \cdot 2H_2O$$

by the process of the present invention, a magnesium-containing material such as $MgO$, $MgCO_3$, $Mg(OH)_2$, $MgOYSiO_2$ or $XMgO \cdot YSiO_2 \cdot 2H_2O$ is alternately layered, in a suitable high pressure vessel, with a silicon containing compound or mineral such as $SiO_2$ or $SiO_2 \cdot xH_2O$. The separate layers can be pressed before stacking or layered as powders and then tamped. An aqueous solution containing mineralizers such as halides (e.g., $NH_4F$, $NH_4Cl$, $NaCl$, $KCl$) as growth promoters and carbonates or hydroxides (e.g., $NaOH$, $Na_2CO_3$) as pH buffers is poured into the raw material vessel so as to be in contact or so that its vapors will be in contact with the solid raw materials, and the vessel is sealed. The vessel is then placed in a furnace or heating jacket and the temperature increased to about 285°–370° C. with pressure being maintained at about 1000–3000 p.s.i.g. Necessary heating times depend upon the thickness of layers, length of fiber desired and fiber growth rate, which latter variable can be changed by the use of different mineralizers. Synthesizing hydroxy chrysotile fibers 1 mm. in length may require at least 10 days. Long, parallel fibers which are parallel to the layers of reactants result from the treatment. This technique for synthesizing hydroxy chrysotiles could also be employed to synthesize hydroxy amphiboles. Further, since the process is carried at relatively low pressures and temperatures, large pressure vessels can readily be used for large scale production.

The following examples illustrate the effectiveness of the process:

FOR FLUORAMPHIBOLES

Example 1

Batch materials (mols): Grams used
.667 $Na_2SiF_6$ ---------------------------- 125.5
.333 $Na_2CO_3$ ---------------------------- 35.6
1.000 $CaCO_3$ ---------------------------- 100.1
7.333 $SiO_2$ ---------------------------- 440.6
5.000 MgO (−8 +35 mesh lumps) ------- 201.6

*Procedure.*—All ingredients were mixed in a ball mill except for the MgO. The MgO lumps were then gently mixed with the other ingredients in a tumbler. The raw materials were then placed in a 2,000 gram capacity fireclay crucible, sealed and fired at 1,000° C. and atmospheric pressure for about 65 hours.

*Results.*—The bulk sample was estimated to be ⅔ to ¾ converted to fibers. The fibers grew radially from the MgO lumps. Smaller MgO lumps would have given complete conversion to fibers.

Example 2

Batch materials (mols): Grams used
1.0 $Na_2SiF_6$ ---------------------------- 188
7.0 $SiO_2$ (fine granular) -------------------- 42
6.0 $Mg(OH)_2$ ---------------------------- 350

*Procedure.*—The $Na_2SiF_6$ and the $SiO_2$ were mixed together and placed in 38 gram layers alternating with 22 gram layers of $Mg(OH)_2$ in a 2,000 gram capacity fireclay crucible. A fireclay lid was placed on the crucible, sealed with air drying refractory cement. The sample was fired for 42 hours at 1,000° C.

*Results.*—A very good fibrous growth occurred. Some of the layers were about 90 percent converted to fibers. Fibers to about 1 cm. in length were obtained.

Example 3

*Batch.*—Same as in Example 2 except the SiO was diatomaceous earth (approximately 80 percent $SiO_2$).

*Procedure.*—Same as Example 2 except 40 gram layers instead of 38 gram layers of the $Na_2SiF_6+SiO_2$ mixture were used to adjust for the impurities in diatomaceous earth.

*Results.*—Fiber growth was excellent at the layer interfaces. About 90 percent conversion took place toward the top of the stack. Estimated fiber length was 4 to 6 mm.

Example 4

*Batch.*—Same as in Example 2 except the $SiO_2$ was silicic acid ($SiO_2 \cdot xH_2O$).

*Procedure.*—Same as Example 2 except 44 gram layers instead of 38 gram layers of the $Na_2SiF_6+SiO_2$ mixture were used to adjust for the water in silicic acid.

*Results.*—Fiber growth was excellent. Almost 100 percent conversion took place in the upper layers.

Example 5

Batch materials (mols): Grams used
1.33 $Na_2SiF_6$ ---------------------------- 250.2
.17 $Na_2SiF_6$ ---------------------------- 18.0
6.67 $SiO_2 \cdot xH_2O$ ---------------------------- 400.8
6.00 $Mg(OH)_2$ ---------------------------- 350.0

*Procedure.*—Same as Example 2 except 130 gram layers of $Na_2SiF_6+Na_2CO_3+SiO_2 \cdot xH_2O$ and 60 gram layers of $Mg(OH)_2$ were used, and the sample was fired for 95 hours.

*Results.*—An excellent growth of fibers occurred. The upper layers were completely converted to fluoramphibole fibers.

FOR CHRYSOTILE

Example 6

Batch materials: Grams used
MgO ---------------------------------- 2.5
$SiO_2$ ---------------------------------- 2.5

*Procedure.*—The raw materials were pressed into 8 discs. Two one gram discs of 1.5 mols MgO+1 mol $SiO_2$ were prepared for use at the bottom and top of the stack. Three .5 gram discs of $SiO_2$ and three .5 gram discs of MgO were pressed and alternately layered in the stack. The finished stack from the bottom up then consisted of layers of 1.5 MgO+$SiO_2$, $SiO_2$, MgO, $SiO_2$, Mgo, $SiO_2$, MgO and 1.5 MgO+$SiO_2$. The raw material mixture at each end was for comparison of results in homogeneous and heterogeneous batches.

The stack was wrapped in platinum foil to prevent separation of the layers. Holes were punched in the foil to allow free movement of the hydrothermal solution.

The packaged stack of discs were placed in a 30 ml. platinum crucible. The crucible was then filled with an aqueous solution containing .19 g. of $NH_4F$ (used as a mineralizer) and sufficient $Na_2CO_3$ to raise the pH of the solution to 10.5. A platinum lid was welded to the top of the crucible so as to completely seal in the solution. The platinum crucible was fired in a pressure bomb which was filled with water. The pressure was maintained in the range of 900 p.s.i.g. to 1500 p.s.i.g. and the temperature in the range of 300° C. to 340° C. for a period of one month.

*Results.*—After drying the stack of discs many fibers in layers were observed at the MgO and $SiO_2$ disc interfaces. The fibers were perfectly oriented parallel with each other and were in veins which were very much like those found in nature. The widest vein was observed as .3 mm. thick at its thickest point. Electron microscope examination revealed that the fibers were chrysotile of excellent quality.

The uppermost and lowermost discs were examined with a binocular microscope and found to contain no visible chrysotile. They perhaps did contain submicroscopic chrysotile but this was not ascertained.

Example 7

Batch materials: Grams used
MgO ---------------------------------- 5
$SiO_2 \cdot xH_2O$ (silicic acid) ------------------ 5

*Procedure.*—Two 2.5 gram discs of MgO and two of $SiO_2 \cdot xH_2O$ were pressed at 1000 p.s.i.g. and 500 p.s.i.g. respectively. The MgO discs only were prefired at 1,000° C. to cause hardening of the discs. The discs were stacked in the following order: $SiO_2$-MgO-$SiO_2$-MgO. The stack was wrapped and sealed in a platinum crucible as in Example 6. After sealing the crucible, a hole was punched in the lid and the following solution injected with a hypodermic needle; 89.90 percent $H_2O$, 0.91 percent $NH_4F$, 9.10 percent $Na_2CO_3$, pH—10.32, volume—25 ml.

The injection hole was then sealed by welding. The sample was then treated as that in Example 6 except the temperature ranged from 330° to 340° C., the pressure ranged from 1000 p.s.i.g. to 2000 p.s.i.g. and the heating time was 10 days.

*Results.*—Chrysotile veins could not be found between the layers of MgO and $SiO_2 \cdot xH_2O$, but areas of surface on the upper silica layer were covered with a thin skin of parallel chrysotile fibers. The fibers grew parallel with the silica surface. Although individual fibers were too long to measure with the electron microscope it was apparent by use of a binocular microscope that the fibers were continuous over a distance of at least 1 mm. They were identified as chrysotile by the use of an electron microscope.

Although synthetic asbestos fibers have been produced in the past, the process of the present invention produces for the first time, so far as is known, long fibers oriented in a desired manner. Synthetic asbestos will be preferred over the natural product for high temperature electrical insulation because of its high purity.

Although the particular process herein described is well adapted to carry out the objects of the present invention, it is to be understood that various modifications and changes may be made all coming within the scope of the following claims.

What is claimed is:

1. In a process for producing synthetic chrysotile asbestos fibers wherein a substance comprising a magnesium compound is reacted with a substance comprising silica, the improvement comprising dispersing individual masses of said magnesium compound-comprising substance in said silica-comprising substance, both of said substances being solids, said masses being large enough to prevent intimate mixing between said magnesium compound-containing substance and the other reactants; and heating said dispersion to react said substances together and form said synthetic chrysotile fibers.

2. The process of claim 1 wherein said dispersion comprises a plurality of layers of said magnesium-comprising substance alternating between layers of said silica-comprising substance.

3. The process of claim 1 wherein said dispersion is contacted with water prior to said reaction, wherein mineralizers are dissolved in said water to promote fiber growth, and wherein said water-containing dispersion is reacted at a temperature of about 285°–370° C., at a pressure of about 1000–3000 p.s.i.g., for a period of time of at least several days.

4. The process of claim 3 wherein said dispersion comprises a plurality of layers of said magnesium compound-comprising substance alternating between layers of said silica-comprising substance.

5. In a process for producing synthetic amphibole asbestos fibers wherein a reactant comprising a magnesium compound, reactants comprising compounds of such other metallic elements as are present in said synthetic amphibole asbestos, and a reactant comprising silica are reacted together to form said asbestos fiber, the improvement comprising dispersing individual masses of said magnesium compound-comprising reactant in an intimate mixture of said silica-comprising reactant and said reactants comprising compounds of said other metallic elements, all the ingredients of said dispersion being solids, said masses being large enough to prevent intimate mixing between said magnesium-compound containing substance and the other reactants; and heating said dispersion to react said ingredients and form said synthetic amphibole fibers.

6. The process of claim 5 wherein said dispersion comprises a plurality of layers of said magnesium compound-comprising substance alternating between layers of said intimate mixture.

7. The process of claim 5 wherein said synthetic asbestos is a fluoramphibole, and wherein at least one of the substances in said dispersion contains fluorine.

8. The process of claim 7 wherein said dispersion comprises a plurality of layers of said magnesium compound-comprising substance alternating between layers of said intimate mixture.

9. The process of claim 7 wherein said reaction is carried out at a temperature of about 900°–1000° C., at an absolute pressure of about one atmosphere, for a period of time of at least 25 hours.

10. The process of claim 9 wherein said dispersion comprises a plurality of layers of said magnesium compound-comprising substance alternating between layers of said intimate mixture.

References Cited

UNITED STATES PATENTS 3,201,196   8/1965   Gier _____ 23—110

OTHER REFERENCES

Saito et al.: Chem. Abstracts, vol. 56, p. 13792f (6–1962).

Fedoseev et al.: Chem. Abstracts, vol. 62, p. 15879h (6–1965).

Fedoseev et al.: Chem. Abstracts, vol. 64, p. 12337d (4–1966).

EDWARD J. MEROS, Primary Examiner

U.S. Cl. X.R.

106—58